(12) United States Patent
Tormasov et al.

(10) Patent No.: US 11,789,617 B2
(45) Date of Patent: Oct. 17, 2023

(54) INTEGRATION OF HASHGRAPH AND ERASURE CODING FOR DATA INTEGRITY

(71) Applicant: Acronis International GmbH, Schaffhausen (CH)

(72) Inventors: Alexander Tormasov, Moscow (RU); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/304,942

(22) Filed: Jun. 29, 2021

(65) Prior Publication Data

US 2022/0413710 A1   Dec. 29, 2022

(51) Int. Cl.
*G06F 3/06* (2006.01)

(52) U.S. Cl.
CPC ............ *G06F 3/0619* (2013.01); *G06F 3/064* (2013.01); *G06F 3/067* (2013.01); *G06F 3/0652* (2013.01)

(58) Field of Classification Search
CPC ...... G06F 3/0619; G06F 3/064; G06F 3/0652; G06F 3/067
See application file for complete search history.

(56) References Cited

U.S. PATENT DOCUMENTS

| | | | | |
|---|---|---|---|---|
| 8,429,359 B1* | 4/2013 | Desai | ................. | G06F 11/1461 |
| | | | | 711/E12.103 |
| 8,538,919 B1* | 9/2013 | Nielsen | ............... | H04L 63/0272 |
| | | | | 718/1 |
| 8,593,678 B2* | 11/2013 | Ohishi | ................. | H04N 1/2166 |
| | | | | 358/1.15 |
| 9,075,705 B2* | 7/2015 | Hikichi | ................. | G06F 11/004 |
| 9,092,182 B2* | 7/2015 | Ohishi | ................. | H04N 1/00944 |
| 9,344,596 B2* | 5/2016 | Ohishi | ............... | H04N 1/00973 |
| 9,800,291 B1* | 10/2017 | Ben David | ......... | G06F 11/1415 |
| 10,114,980 B2 | 10/2018 | Barinov et al. | | |
| 10,185,507 B1* | 1/2019 | Olson | ................... | G06F 3/0689 |
| 10,216,740 B2 | 2/2019 | Neporada et al. | | |
| 10,257,122 B1* | 4/2019 | Li | ........................... | H04L 45/54 |
| 10,261,690 B1* | 4/2019 | Shalev | ................ | G06F 3/0659 |
| 10,333,694 B1* | 6/2019 | Hu | ..................... | G06F 16/1805 |
| 10,365,983 B1* | 7/2019 | Foley | ................ | G06F 11/2094 |
| 10,430,279 B1* | 10/2019 | Dittia | ................... | G06F 3/0656 |
| 10,613,935 B2 | 4/2020 | Tormasov et al. | | |
| 2003/0084397 A1* | 5/2003 | Peleg | ................ | G06F 11/1076 |
| | | | | 714/E11.034 |

(Continued)

FOREIGN PATENT DOCUMENTS

| | | | | |
|---|---|---|---|---|
| CA | 3000340 A1 * | 10/2018 | .......... | G06Q 20/027 |
| WO | WO-03062979 A2 * | 7/2003 | .......... | G06F 3/0605 |
| WO | WO-2020143431 A1 * | 7/2020 | | |

OTHER PUBLICATIONS

Kondalalith1, "The Gossip Protocol in Cloud Computing", May 4, 2020, pp. 1-5, https://www.geeksforgeeks.org/the-gossip-protocol-in-cloud-computing/ (Year: 2020).*

(Continued)

*Primary Examiner* — Christopher D Birkhimer
(74) *Attorney, Agent, or Firm* — ESPE Legal Consultancy FZ-LLC

(57) ABSTRACT

A data storage system uses erasure coding in combination with hashgraph to organize stored data and recover that data in a computing environment.

20 Claims, 5 Drawing Sheets

(56) References Cited

U.S. PATENT DOCUMENTS

| | | | | |
|---|---|---|---|---|
| 2004/0117414 | A1* | 6/2004 | Braun | G06F 8/65 |
| 2006/0005074 | A1* | 1/2006 | Yanai | G06F 3/061 |
| | | | | 714/6.32 |
| 2008/0140902 | A1* | 6/2008 | Townsend | H04B 1/0475 |
| | | | | 710/306 |
| 2008/0307020 | A1* | 12/2008 | Ko | G06F 21/6245 |
| 2011/0236049 | A1* | 9/2011 | Haga | G03G 15/5004 |
| | | | | 399/75 |
| 2012/0096217 | A1* | 4/2012 | Son | G06F 12/0246 |
| | | | | 711/E12.008 |
| 2013/0024423 | A1* | 1/2013 | Doshi | G06F 11/1448 |
| | | | | 707/640 |
| 2013/0173554 | A1* | 7/2013 | Ubukata | G06F 11/2094 |
| | | | | 707/640 |
| 2013/0304706 | A1* | 11/2013 | MacInnis | H04L 67/1097 |
| | | | | 707/658 |
| 2015/0019727 | A1* | 1/2015 | Parakh | H04L 67/1004 |
| | | | | 709/225 |
| 2015/0370713 | A1* | 12/2015 | Morishita | G06F 13/10 |
| | | | | 711/119 |
| 2017/0132082 | A1* | 5/2017 | Resch | G06F 3/067 |
| 2017/0329541 | A1* | 11/2017 | Hayasaka | G06F 12/0811 |
| 2018/0115428 | A1* | 4/2018 | Lysenko | H04L 9/0637 |
| 2019/0097900 | A1* | 3/2019 | Rodriguez | G06F 16/27 |
| 2019/0109713 | A1* | 4/2019 | Clark | H04L 67/104 |
| 2020/0005264 | A1* | 1/2020 | Patterson | G06Q 50/06 |
| 2020/0005403 | A1* | 1/2020 | Patterson | G06Q 20/10 |
| 2020/0005404 | A1* | 1/2020 | Patterson | G07F 15/06 |
| 2020/0026510 | A1* | 1/2020 | Adams | G06F 8/71 |
| 2020/0089420 | A1* | 3/2020 | Sharoni | G06F 3/0637 |
| 2020/0151686 | A1* | 5/2020 | Komandur | H04L 9/3239 |
| 2021/0081403 | A1* | 3/2021 | Tian | G06F 3/0658 |
| 2021/0149772 | A1* | 5/2021 | Zatsepin | G06F 11/1004 |
| 2021/0286538 | A1* | 9/2021 | Volkov | G06F 3/064 |

OTHER PUBLICATIONS

Acronis, "RAID 10—What's RAID 10 And Why Should I Use It?", Aug. 16, 2018, pp. 1-6, https://www.acronis.com/en-us/blog/posts/whats-raid10-and-why-should-i-use-it/ (Year: 2018).*

Ramesh Natarajan, "RAID 10 Vs RAID 01 (RAID 1+0 Vs RAID 0+1)", Oct. 24, 2011, pp. 1-49, https://www.thegeekstuff.com/2011/10/raid10-vs-raid01/ (Year: 2011).*

Paul Massiglia, "The RAID book: A Storage System Technology Handbook", 6th Edition, 1997, pp. 152-157 (Year: 1997).*

Anonymous, "What Are Distributed Systems?", Feb. 1, 2021, pp. 1-13, https://www.splunk.com/en_us/data-insider/what-are-distributed-systems.html (Year: 2021).*

Argha_c14, "Difference between Blockchain and a Database," May 11, 2022, pp. 1-5, https://www.geeksforgeeks.org/difference-between-blockchain-and-a-database/ (Year 2022).

Suresh Choudhary, "The Hedera Hashgraph vs Blockchain Showdown" May 12, 2022, pp. 1-12, https//www.konstantinfo.com/blog/hashgraph-vs-blockchain/ (Year 2022).

* cited by examiner

INTEGRATION OF HASHGRAPH AND ERASURE CODING FOR DATA INTEGRITY

TECHNICAL FIELD

The invention pertains to data storage and recovery in a computing environment.

BACKGROUND

Data centers are widely used to store large amounts of digital data created and used by computing systems. Such data centers must be designed with safeguards against corruption or loss of data. This is particularly true for applications that require high levels of consistency. For example, virtual machines may be difficult to restore from snapshots if there are inconsistencies in stored data. Consistent and reliable recovery of data is therefore essential and ensuring reliable recovery is an ongoing problem in the field of data storage.

Typically, data is stored in data centers according to an N-K scheme. In this scheme, a file of size M is split into k chunks, with each chunk being the same size. Thus, each chunk may be represented as M/k. Then an (n, k) code is applied on these k chunks to get n chunks, each of the same size M/k. Now the effective size is nM/k and the file size is expanded n/k times. In this scheme, n should be greater than or equal to k, so that n/k is at least 1. If n equals k, then the file is simply split and there is no coding performed and no redundancy. The (n,k) code is selected so that any k chunks out of the n chunks can be used to recover the original file. This redundancy is one way to ensure consistency in data recovery.

A graphical representation of a typical system 100 shows that data on a client device is divided into k total blocks. These blocks are transformed into n data chunks. These chunks are stored in M storage nodes under the control of a storage management service that is capable of data storage mapping.

As data is updated, a dedicated server typically stores metadata which contains information about the data, the storage node that received the updated data, and when the updated data was received. But regular updates in data stored in live systems makes consistency harder to achieve.

SUMMARY

To track updates, a directed acyclic graph ("DAG") with Byzantine Fault Tolerance is used together with erasure coding algorithms. This combination provides for consistent data placement across storage nodes, as well as for consistent data recovery.

One example of DAG technology with Byzantine Fault Tolerance is hashgraph. Hashgraph implements an asynchronous consensus algorithm that allows for virtual voting. This is unlike Bitcoin, for example, which uses proof-of-work blockchains instead of voting. In a data-storage environment, the consensus provided by technology such as hashgraph is important because there is a risk that storage nodes will become corrupted or even malicious. By design, systems that implement hashgraph technology can resist subversion unless 34% or more of the system's members become unreliable.

The invention may therefore be implemented with DAG technology such as hashgraph. In exemplary embodiments, the invention uses a hashgraph for maintaining consistent data. Other DAG technologies could also be used if they provide for Byzantine Fault Tolerance or reliable means for reaching consensus.

In an embodiment, the consensus of 34% or more nodes in the distributed system can lead to consensus. So, the K index in the NK scheme should be not less than ⅓ of all the available servers.

The hashgraph protocol generates a Time Stamp Ordering (TSO) and this allows data to be restored consistently. Hashgraph protocol also uses a gossip-protocol to track which server-nodes are available. This further contributes to optimal data restoration and recovery.

Erasure coding optimizes data restoration and recovery in several ways. These optimizations include space savings, reduced chances of failure, flexibility, and the ability to recover data without an original copy of the data. Erasure coding allows space to be used more efficiently, in some cases saving up to 50% more storage space than other schemes. With erasure coding, data is divided into independent units so that the failure of one unit does not affect other units. Erasure coding's effectiveness does not depend on the size of the files being stored and thus it may be adapted to all typical use cases. Data can be recovered by the system without access to the original data though the use of data chunks.

In an embodiment, erasure coding and the hashgraph protocol is carried out within a distributed-ledger system remote from a client device. In an alternative embodiment, the erasure coding and hashgraph protocol are carried out within a distributed-ledger system on a client device. In a further embodiment, at least some aspects of erasure coding and the hashgraph protocol are carried out both on a client device and by a remote service.

DETAILED DESCRIPTION

The invention is implemented by systems and methods that include a form of erasure coding combined with a DAG with Byzantine Fault Tolerance. In preferred embodiments, the DAG employed is a distributed ledger that uses hashgraph technology.

Proof-of-work blockchains, such as those used with Bitcoin, are not used. Such blockchains are not Byzantine because member nodes never know for certain when consensus has been reached. For example, two blocks can be mined simultaneously and the blockchain will fork until the community decides which branch to develop. The other branch may eventually get discarded even though time and resources were spent mining it. Electricity costs are incurred running computations and proof-of-work inherently requires computations that end up being unnecessary.

The hashgraph consensus algorithm does not require any pruning because it does not create blocks that become superfluous. No proof-of-work is required and each miner may mine many new blocks each second. In a preferred embodiment, a hashgraph is spread through a gossip protocol. In this gossip protocol the subject is the history of the gossip, which can be described as "gossip about gossip."

The gossip is exchanged by members who can create signed transactions. Under the gossip protocol, gossip spreads among members randomly. All members eventually get a copy of the information and the community of members reaches consensus, or Byzantine agreement, about the chronological order of the transactions.

Less computing resources are used because the hashgraph protocol relies on virtual voting. Each member has a copy of the hashgraph. This means that members can calculate what vote other members would have sent in a traditional Byzantine agreement protocol. No actual votes need to be sent and no computing resources are used apart from gossiping about the hashgraph.

Figure 1:
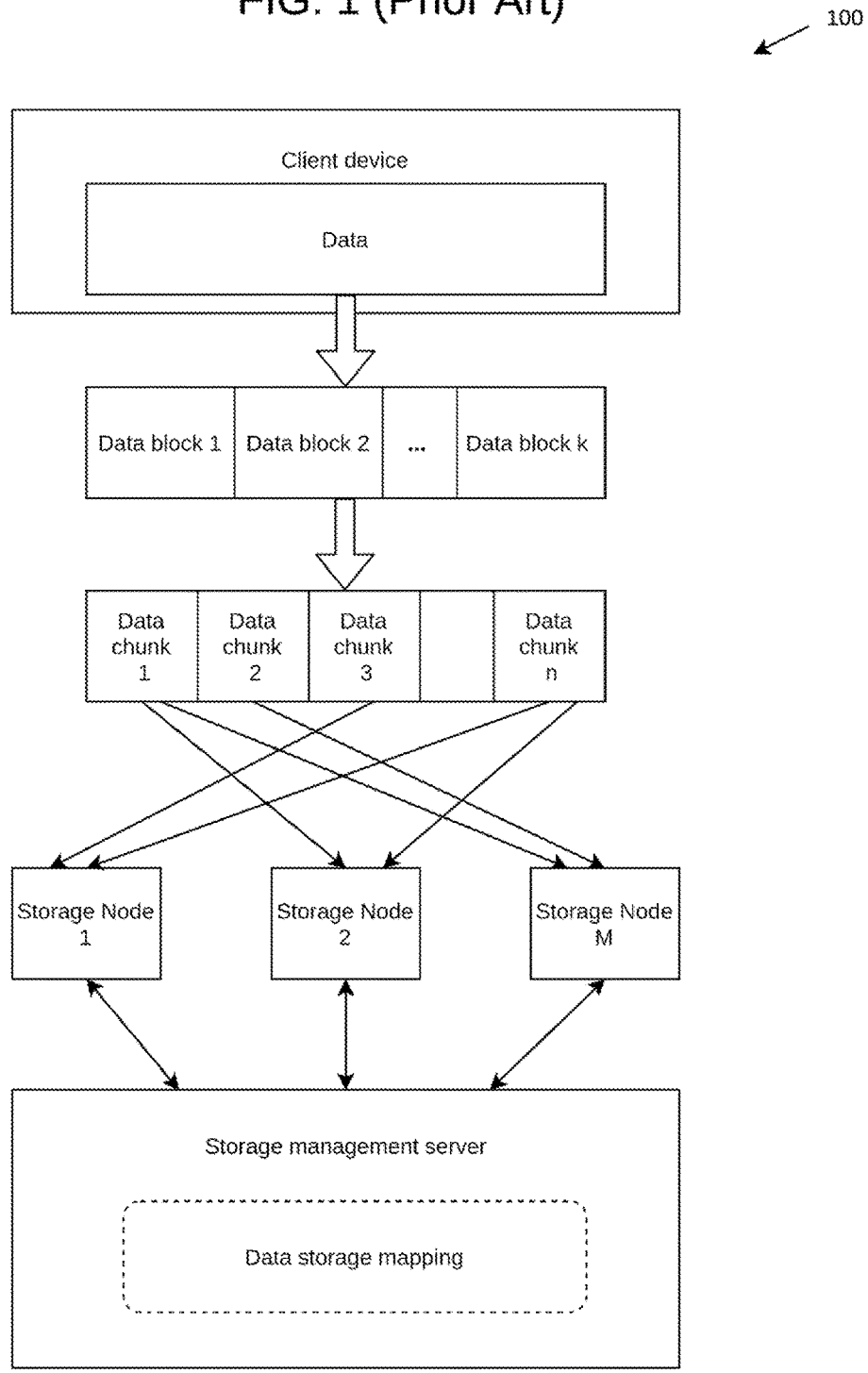
FIG. 1 shows an implementation of prior erasure coding in a computing environment.
Figure 2:
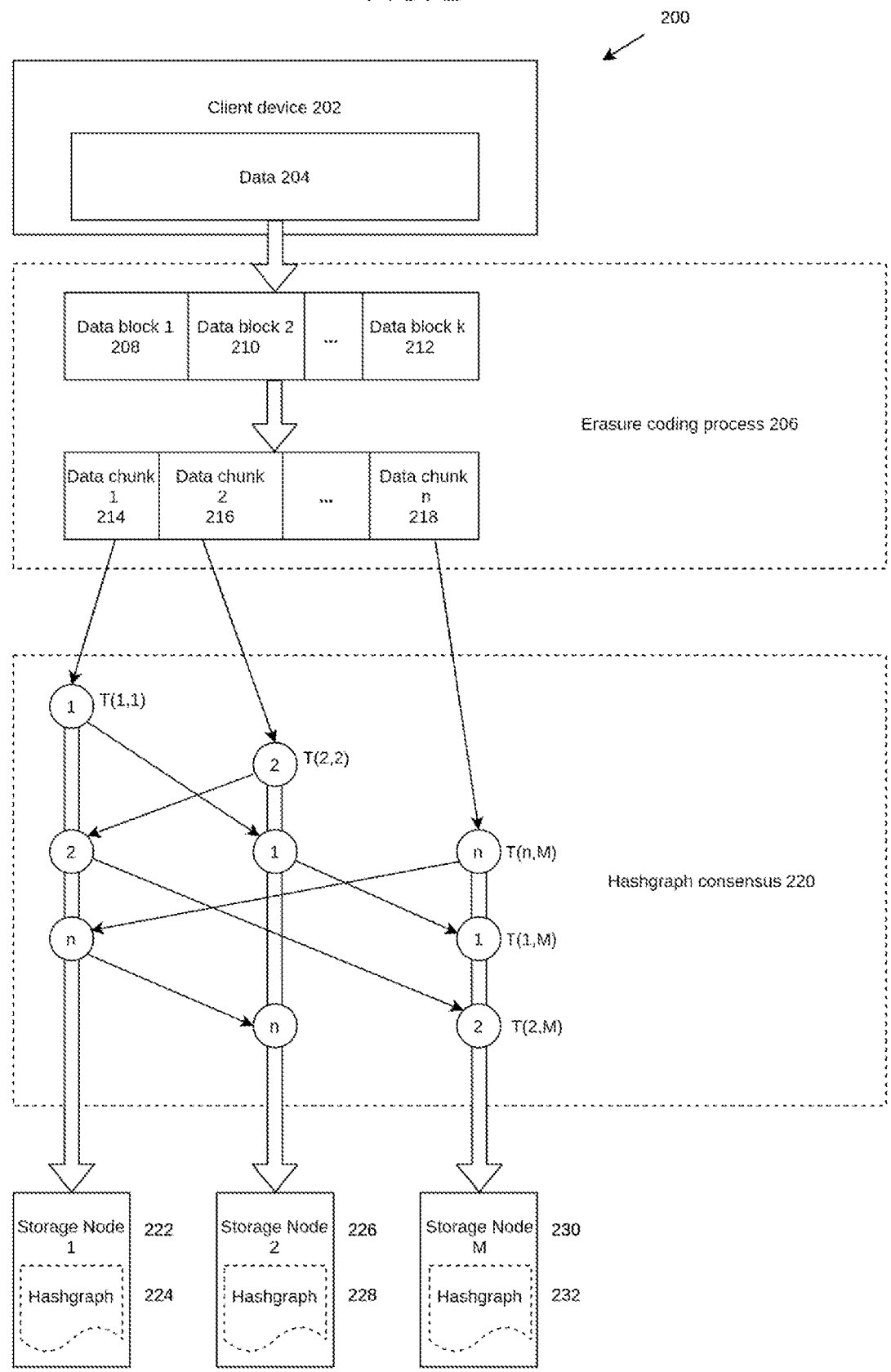
FIG. 2 shows an embodiment of erasure coding combined with a hashgraph consensus algorithm to store data in nodes.

FIG. 2 shows a data storage architecture 200 where a client device 202 with linked data 204 is accessed by an erasure coding process 206. The erasure coding process 206 starts with data 204 converted into k data blocks. In FIG. 2, these k data blocks are represented by data block 1 (208), data block 2 (210), up to the last data block k (212). After erasure coding, the blocks have been redivided into n chunks, which are represented by data chunks 1 (214), 2 (216), and n (218).

The method of erasure coding generally proceeds by dividing data into blocks of approximately equal size and calculating additional parity chunks that can be used to reconstruct failed data chunks. Reed-Solomon coding may be used for this purpose. For example, for k data blocks, n data chunks are generated that include the original blocks in k chunks plus m parity chunks. This is expressed by the formula n=k+m. The original data can be reconstructed as long as there are no more than m failures ("erasures") in the n data chunks, where m is the difference between the original number of data blocks k and the total number of chunks n. Thus, m=n-k.

Hashgraph consensus 220 shows a hashgraph data structure with M member nodes, each with its own copy of the hashgraph. These member nodes are storage Node 1 (222) with hashgraph 224, storage Node 2 (226) with hashgraph 228, up to the last storage Node M (230) with hashgraph 232. Each member is represented by a column in the graph. Time with respect to each graph event is represented by a downward arrow. Each vertex represents a gossip event and is stored in memory at each storage node as a sequence of bytes. For clarity, gossip events on the graph are described as "vertices" instead of "nodes." The term "nodes" in this description refers to hashgraph-member storage nodes.

The hashgraphs 224, 228, and 232 may not be exactly the same at any given time. Because gossip events change the stored hashgraphs over time, a comparison of any two hashgraphs may get different results. If the hashgraphs stored at two storage nodes are the same, then each node can calculate the order of events represented by the vertices and each will receive the same answer. If two storage nodes have different hashgraphs, they will usually match with respect to events that are older in time. With very recent events, the situation is different. One node may have gossip events that the other node has not yet learned about. But even if the hashgraphs at any two nodes may differ at a given time, this does not mean that these two hashgraphs are inconsistent. If the hashgraphs at two nodes have both recorded a particular gossip event, the two hashgraphs will have the same metadata about that gossip event. And if a given storage node does not yet have a particular gossip event, the gossip protocol ensures that the gossip event will eventually be known to all member storage nodes. The gossip protocol is said to be asynchronous because no assumptions are made about the rate at which gossip events are shared and there is no predetermined timeout period.

When a member storage node receives a gossip event from another member, a synchronization is performed. For example, when storage node 1 (222) syncs with storage node 2 (226), storage node 1 sends all gossip events stored in hashgraph 224 that are not yet known to storage node 2. Storage node 2 adds the new gossip events to its hashgraph 228. For added security, storage node 2 may accept only gossip events with valid signatures containing valid hashes of parent events stored in hashgraph 228. Timestamps or timestamp hashes may also be included with gossip events to ensure that gossip events can be ordered chronologically with certainty by the system.

The order of gossip events within the hashgraph consensus 220 may be determined independently by each member node. Each member storage node may calculate the overall order of gossip events in its timeline. After each sync, a member storage node calculates the consensus order for as many events as possible given the information available. This calculation can be done locally and therefore puts a relatively small load on system resources.

Over time, gossip events about each of the data n chunks are conveyed to M storage nodes. Each gossip event includes metadata about a particular data chunk. In an embodiment, gossip events include at least one hash value. For example, the gossip event may include a hash of the data itself. The gossip event can also include a hash signature corresponding to the storage node where the data is stored. Other metadata, such as a timestamp, may also be part of the gossip event.

FIG. 2 shows a structure where storage notes 222, 226, and 230 each receive one gossip event corresponding to each of the n data chunks. The n data chunks in the hashgraph (1, 2, and n) correspond to data chunks 214, 216, and 218. In an embodiment, when a storage node receives a data chunk, it generates a gossip event containing a first hash that uniquely identifies the data, a second hash that identifies that storage node for that data, and a timestamp. This gossip event is sent randomly to others of the M storage nodes in the system, who in turn randomly repeat the gossip event to other storage nodes. As soon as more than ⅓ of the storage nodes have a particular gossip event in their hashgraphs, the metadata in the gossip event can be established to be reliable.

The gossip protocol continues until all storage nodes M have a hashgraph corresponding to each of the n data chunks. The consensus of additional nodes further enhances the ability of the system to confirm the integrity of each stored chunk at a given storage node. The n data chunks may then be recovered reliably from the M storage nodes, even if some of the storage nodes are unreliable. The erasure coding process used to create the n chunks also ensures that the original data 204 can be reconstructed even if some of the n chunks are unavailable or corrupted.

The gossip protocol proceeds similarly when any of the n data chunks is updated or changed. The use of timestamps in the gossip protocol allows the history of each chunk to be verified so that the most recent chunks may be retrieved. In an embodiment, a given hashgraph's record of the chronology stored system data chunks is used for version control.

The verifiable chronology in the hashgraphs allows for reliable intermediate data chunks to be identified and tracked, as well as the first and last versions. These versioned data chunks can be used to restore the original data to its state at different points in time.

Figure 3:
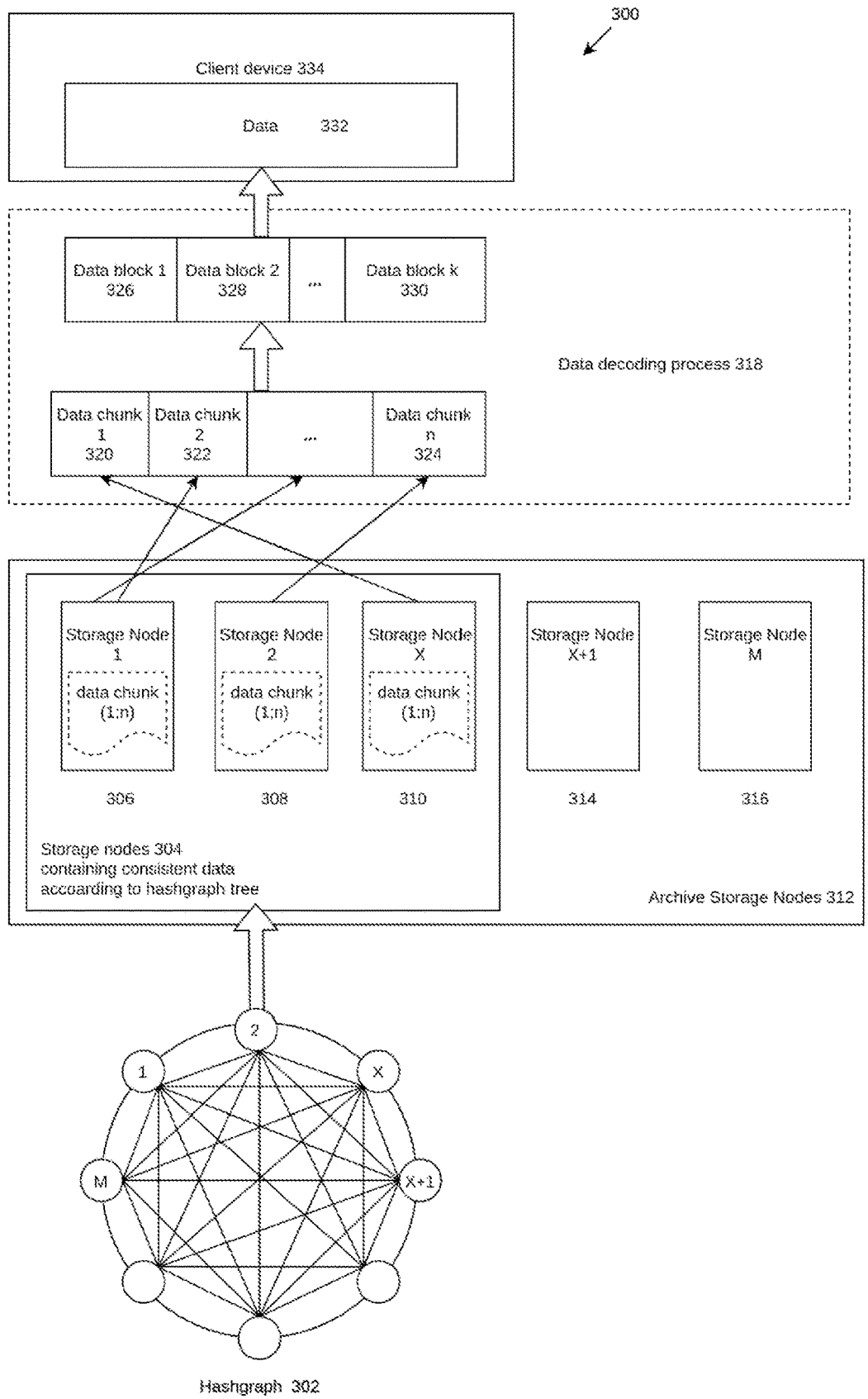
FIG. 3 shows an embodiment of data recovery and decoding in a system with storage nodes linked to a hashgraph.

FIG. 3 shows recovery process 300 where hashgraph 302 is used to confirm the consistency of n data chunks stored storage nodes 304 comprising nodes 1-X (306, 308, and 310). For added security, archive storage nodes 312 include nodes X+1 (314) and M (316). The archive storage nodes 312 ensure that the system can reliably restore data by preserving additional copies of data chunks. In an embodiment, at least two archive nodes 312 are used.

The consistent storage nodes 304 allow for data decoding process 318 to proceed reliably. Each storage node contains one or more data chunks and a hashgraph with gossip events about other data chunks in the system. When more than ⅓ of the storage nodes agree on metadata for n data chunks 320, 322, and 324, then k data blocks 326, 328, and 330 can restore original data 332 on client device 334. The erasure coding process 318 ensures that for any original data, only k data chunks are required for restoring the original k data blocks.

Figure 4:
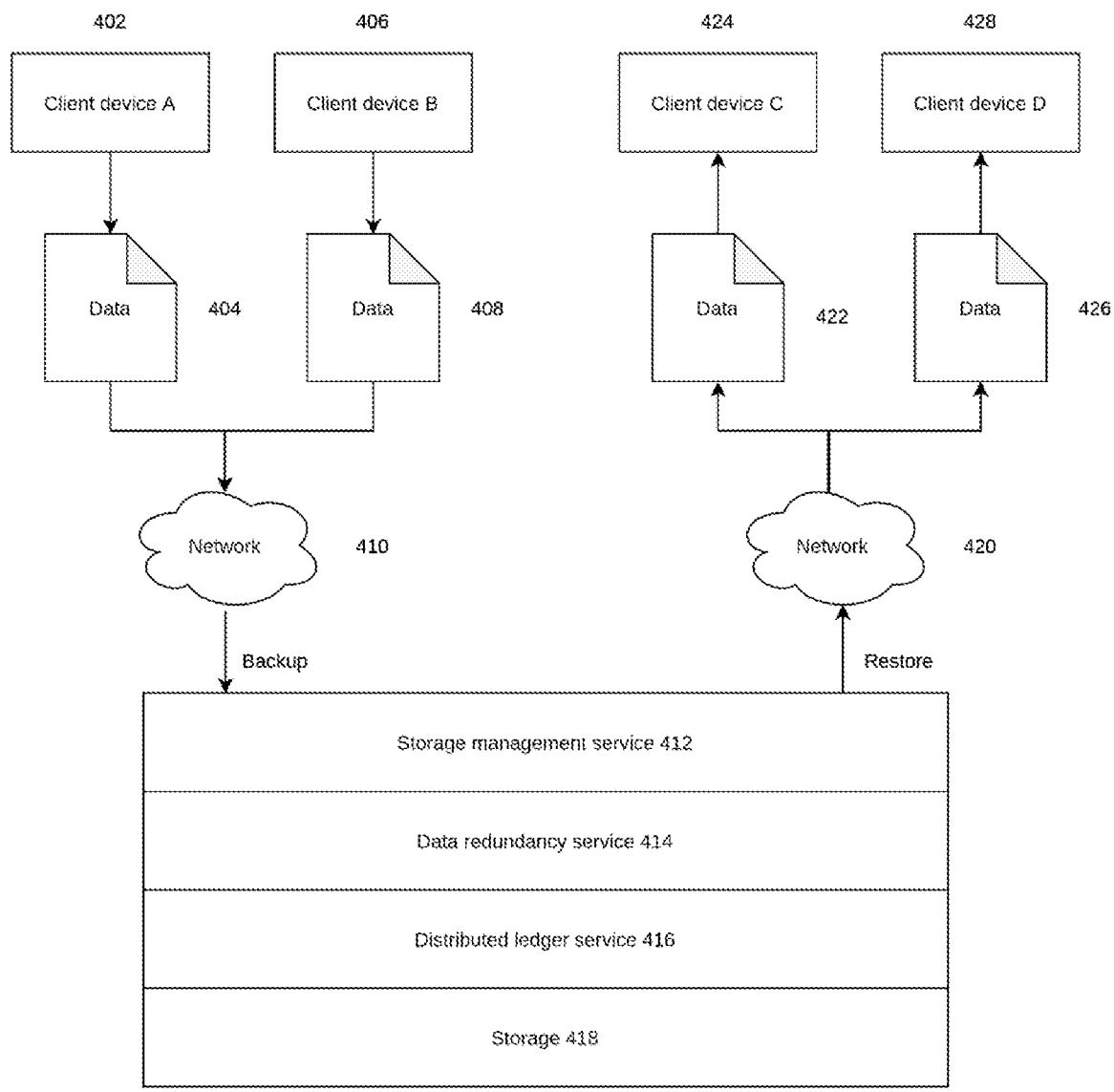
FIG. 4 shows an embodiment of data backup and recovery where data is transmitted from client devices to a storage management system including a distributed ledger.

FIG. 4 shows an exemplary data backup and restoration system 400. In system 400, client device A 402 has first data 404 and a client device B 406 has second data 408. First and second data are sent via network 410 to a storage management service 412. The storage management service 412 communicates with data redundancy service 414. Data redundancy service divides and copies the original data 404 and 408 so that the original data can be restored without the original data itself. Distributed ledger service 416 communicates with data redundancy service 414 and creates a verifiable record of the redundant data. In an embodiment, the distributed ledger service is a hashgraph. Distributed ledger service 416 communicates with storage 418, which provides persistent storage for the data managed by services 412, 414, and 416. Storage 418 may be divided into one or more physical or virtual storages and may be physically located in one or more geographical places. Storage 418 comprises one or more storage mediums for persistent storage of digital data.

System 400 restores data by transmitting it over network 420. First restored data 422 is delivered to client device C 424 and second restored data 426 is delivered to client device D 428. In an embodiment, first and second restored data 422 and 426 are not identical to original data 404 or 408 but represent specific combinations of data requested by system administrators or system users for access by client device C 424 or client device D 428. Alternatively, at least one of first restored data 422 and second restored data 426 is identical to one of first data 404 or second data 406. At least one of client devices C 424 and D 428 may be the same as client devices A 402 or B 404.

Tracking of data in system 400 may be facilitated by metadata that identifies each client device that stored a particular data block. For example, client device 402 or storage management service 412 may append a hash value to data 404 that uniquely identifies client device 402 as the original source of data 404. Further identifiers can be added for subsequent storages. For example, distributed ledger service 416 can append a hash value data stored in storage 418 that uniquely identifies the physical or virtual storage medium. Distributed ledger 418 can include a timestamp that allows the history of stored data to be tracked, including versioning of the data over time. In this way, distributed ledger service 416 can verify the integrity of data within system 400 by maintaining a verifiable record showing how units of data have been processed and moved throughout the system at different points in time.

In system 400, the security of data transmitted over network 410 may be ensured in a number of ways. For example, data may be encrypted at-rest before entering the network. Alternatively, the network may be configured to encrypt the data in-transit. Specific encryption algorithms or transfer protocols may be chosen based on specific use cases. Relevant factors include the amount of data transferred, the level of security required, system resources, and hardware limitations.

Figure 5:
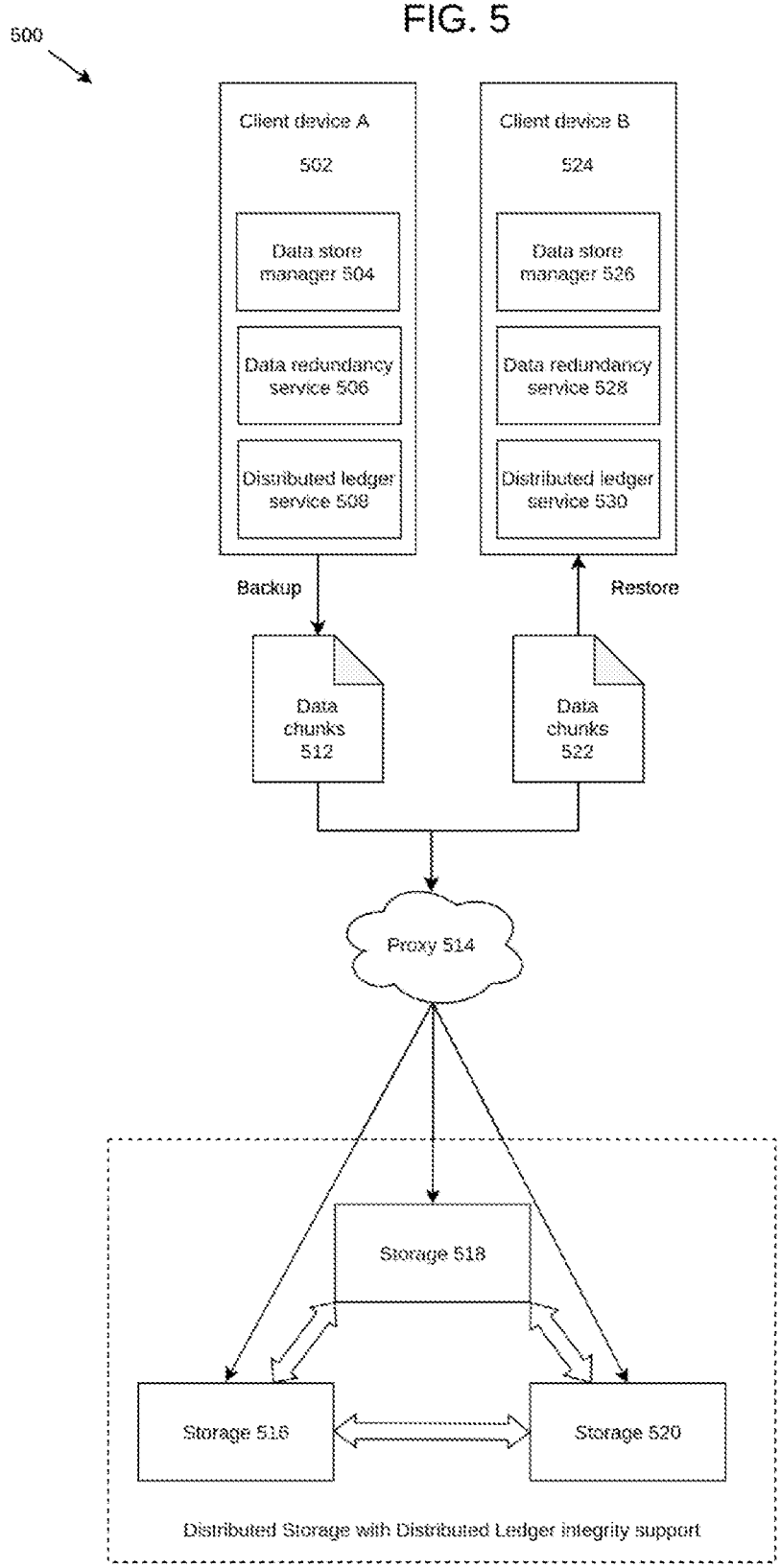
FIG. 5 shows an embodiment of data backup and recovery where a local agent on a client device transmits data chunks to a distributed storage system with a distributed ledger.

FIG. 5 shows system 500, an alternative implementation of a data backup and recover system. In system 500, client device A 502 includes data store manager 504, data redundancy service 506, and distributed ledger service 508. Data store manager 504, data redundancy service 506, and distributed ledger service 508 may be combined into one or more modules on client device A 502. This module (or modules) processes data associated with client devices to create data chunks 512. These data chunks are created using the erasure coding protocol and hashgraph consensus described above.

Once a consistent and verifiable set of data chunks 512 has been created, these chunks are sent via proxy 514 to one or more storages 516, 518, and 520. Storages 516, 518, and 520 include a distributed ledger, such as a hashgraph, to verify their integrity, track versions, and ensure that the chunks can be restored reliably.

For restoration, stored data chunks 522 sufficient to recreate the original data are sent via proxy 514 to client device B 524. Client device B 524 includes data store manager 526, data redundancy service 528, and distributed ledger service 530. Data store manager 526, data redundancy service 528, and distributed ledger service 530 may be combined into one or more modules on client device B 524. This module (or modules) processes data associated with client devices to convert data chunks 522 into data at client device B 524. The restored data may take a variety of forms. For example, the restored data may be the same as the original data processed by client device A. Or the restored data can be an intermediate or updated version of the original data. Alternatively, the restored data can include some form of data associated with client device A and other data stored by storages 516, 518, or 520.

In FIG. 5, the three storages 516, 518, and 520 allow for reliable reconstruction of stored data if two of the three storages have consistent ledgers. In practice, the number of storages may be much greater. In such cases, the stored data may be recovered reliably as soon as more than ⅓ of the storages reach ledger consensus. In an embodiment, the storages continue to exchange gossip events to increase the number of storages with a ledger entry and thereby further increase the reliability of the system. As explained above, it is not required that all storages in the system are reliable. Instead, the system achieves Byzantine Fault Tolerance initially through the consistent witness of at least ⅓ of the total storages. Once the gossip protocol has spread throughout the system, Byzantine Fault Tolerance will be maintained as long as at ⅔ of the total storages are reliable.

As discussed above, client devices are computing devices such as personal computers, servers, and mobile devices, or any machine under the control of a processor that uses or stores data in connection with its operation. Associated data for a particular client device may be stored on physical drives or virtual drives maintained either locally, in the cloud, or both. In this context, "cloud" generally refers to a network of servers in a variety of configurations. Examples include a public cloud that shares resources and offers services to the public over the Internet, a private cloud that offers services over a private internal network and often hosted on-premises, a hybrid cloud where services are shared between public and private clouds depending on intended use, and a community cloud that shares resources between governmental or private organizations.

The invention claimed is:

1. A computer-implemented method for consistent data backup, the method for consistent data backup executed on a processor, the method comprising:
   a. encoding a plurality of first data blocks into a plurality of first data chunks, wherein the number of first data chunks is greater than the number of first data blocks;
   b. storing at least one first data chunk in a storage medium, wherein metadata about the first data chunk is recorded in a ledger communicatively linked to a distributed-ledger system and wherein the metadata comprises a first hash value of the first data chunk and a second hash value identifying the storage medium;
   c. transferring the metadata about the at least one first data chunk using a gossip protocol to a plurality of ledgers within the distributed-ledger system; and
   d. restoring a plurality of second data blocks by way of second data chunks verified by at least ⅓ of the ledgers within the distributed-ledger system, wherein the second data blocks comprise effectively the same data as the first data blocks.

2. The method of claim 1, wherein the step of using the gossip protocol to transfer metadata includes recording the metadata in the form of a hashgraph.

3. The method of claim 2, wherein the first data blocks are generated from original data associated with a client device.

4. The method of claim 3, further comprising the step of restoring the original data to a client device.

5. The method of claim 3, further comprising the step of restoring data to a client device includes the original data in a modified form.

6. The method of claim 2, wherein the hashgraph includes a plurality of timestamps associated with the storage of the at least one data chunk in a storage medium at a plurality of points in time, and wherein a chronology of the timestamps is used to restore the at least one data chunk to its state at one of the plurality of points in time.

7. The method of claim 2, wherein the hashgraph includes metadata about the source of the at least one data chunk.

8. The method of claim 2, wherein steps (a), (b), and (c) are performed by at least one module on a client device.

9. A system for consistent data backup in a computing environment, the system comprising:
   a. a plurality of first data blocks encoded into a plurality of first data chunks, wherein the number of first data chunks is greater than the number of first data blocks;
   b. a storage medium for storing at least one data chunk, wherein metadata about the first data chunk is recorded in a ledger communicatively linked to a distributed-ledger system and wherein the metadata comprises a first hash value of the first data chunk and a second hash value identifying the storage medium;
   c. a communications network wherein metadata about the at least one data chunk can be transferred using a gossip protocol to a plurality of ledgers within the distributed-ledger system; and
   d. a plurality of second data blocks restored by way of second data chunks verified by at least ⅓ of the ledgers within the distributed-ledger system, wherein the second data blocks comprise effectively the same data as the first data blocks.

10. The system of claim 9, further comprising a hashgraph for storing metadata about the first and second data chunks.

11. The system of claim 10, further comprising a client device.

12. The system of claim 11, wherein the first data blocks have been generated from original data associated with the client device.

13. The system of claim 12, further comprising restored data at the client device that incorporates some or all of the original data.

14. The system of claim 10, wherein the hashgraph includes a plurality of timestamps associated with the storage of the at least one data chunk in a storage medium at a plurality of points in time, and wherein a chronology of the timestamps is used to restore the at least one data chunk to its state at one of the plurality of points in time.

15. The system of claim 10, wherein the hashgraph includes metadata about the source of the at least one data chunk.

16. The system of claim 11, wherein steps (a), (b), and (c) are performed by at least one module on the client device.

17. A computer-implemented method for restoring original data from a storage medium, executed on a processor, the method comprising:
   a. verifying metadata about data chunks in a storage medium in communication with a distributed-ledger system by comparing at least ⅓ of the ledgers within the distributed-ledger system, wherein the metadata comprises a first hash value of the first data chunk and a second hash value identifying the storage medium;
   b. creating a plurality of data blocks k from n encoded data chunks, wherein n>k;
   c. assembling the data blocks to create a functionally identical image of the original data.

18. The method of claim 17, wherein the original data was associated with a first client device and further including the step of transmitting the functionally identical image of the original data to a second client device.

19. The method of claim 17, wherein at least one of steps (a), (b), or (c) is performed on a client device.

20. The method of claim 18, wherein at least one of steps (a), (b), and (c) are performed at a remote location, creating a plurality of data blocks k from n encoded data chunks in a persistent storage medium, wherein n>k.

* * * * *